United States Patent [19]

Kobashi et al.

[11] 4,022,710
[45] May 10, 1977

[54] PROCESS FOR PRODUCING COLLOIDAL ANTIMONY OXIDE

[75] Inventors: Toshiyuki Kobashi; Hirotaka Shiota, both of Okayama, Japan

[73] Assignee: Japan Exlan Company Limited, Osaka, Japan

[22] Filed: May 10, 1976

[21] Appl. No.: 684,739

[30] Foreign Application Priority Data

May 21, 1975 Japan .............................. 50-61349

[52] U.S. Cl. ........................................... 252/313 R
[51] Int. Cl.² ........................................... B01J 13/00
[58] Field of Search .......... 423/617, 87; 252/313 R

[56] References Cited

UNITED STATES PATENTS 3,860,523  1/1975  Petrow et al. ................. 252/313 R 3,984,353  10/1976  Sergunkin et al. ................ 423/617

FOREIGN PATENTS OR APPLICATIONS 289,055  2/1971  U.S.S.R. ............................ 423/617

OTHER PUBLICATIONS

Perry, Chemical Engineers' Handbook, Fourth Edition (1963), pp. 4–21 to 4–26.

*Primary Examiner*—O. R. Vertiz
*Assistant Examiner*—Wayne A. Langel
*Attorney, Agent, or Firm*—Wenderoth, Lind & Ponack

[57] ABSTRACT

Colloidal antimony oxide is continuously produced by passing an aqueous dispersion containing antimony trioxide and hydrogen peroxide through a heated tube-type reactor.

14 Claims, No Drawings

PROCESS FOR PRODUCING COLLOIDAL ANTIMONY OXIDE

The present invention relates to a process for the continuous production of colloidal antimony oxide. More particularly, the invention relates to a process wherein an aqueous dispersion, in which antimony trioxide and hydrogen peroxide are dispersed in the ratio of 1 mol of the former to 2 mols or more of the latter, is passed through an extremely elongated tubular reactor having a particular ratio of tube length to tube inner diameter, maintained at a temperature not lower than 90° C., so as to react antimony trioxide with hydrogen peroxide, whereby colloidal antimony oxide having very excellent properties is produced in an industrially advantageous manner.

Antimony oxide has been used together with organic chlorides, bromides and other halogen-containing compounds in order to make fabrics, fibers, plastics, etc. flame-retardant. However, all of such conventional antimony troxide have a large particle size of the degree of pigments, and this causes various trouble such as the deterioration of touch, luster, transparency and physical properties of the products.

To eliminate such troubles, therefore, processes for obtaining antimony oxide of a fine particle size have been studied in recent years. For example, in Japanese Pat. Pub. No. 40166/1970, a process is proposed wherein, after antimony oxide is dissolved in a solvent, a water-soluble organic solvent is added and then the pH of the solution is adjusted, and in Disclosed (Kokai) Japanese patent application No. 78094/1973, a process is proposed wherein antimony oxide is dissolved in a solution of KOH and hydrogen peroxide to react therewith and thereafter the solution is deionized with a cation-exchange resin. In any of these processes, however, in addition to the use of expensive subsidiary materials, high concentration acid or alkali, which is highly corrosive, is used for the dissolution of antimony oxide. This necessarily gives rise to an increase in product cost. Also, complicated operations are required and in addition the process is carried out in a batch system, so that some fluctuation in the quanlity between lots of the product is inevitable.

In view of such a situation of prior art, we restudied in various ways the conventional processes for producing colloidal antimony oxide. As a result, we found a possibility for obtaining a collodial solution in the course of forming antimony pentoxide by oxidizing antimony trioxide with hydrogen peroxide in an aqueous medium. We further studied and found that, when the above mentioned oxidation reaction with hydrogen peroxide is caused to proceed continuously using a tubular reactor having a particular shape, a colloidal solution of antimony oxide can be produced in an industrially advantageous manner, without using any expensive subsidiary materials as used in the conventional processes and without requiring any complicated operations. The present invention is based on this discovery.

The main object of the present invention is, therefore, to provide a new and improved process for producing collodidal antimony oxide.

An object of the present invention is to continuously produce antimony oxide having a good standing stability and uniform in quality.

Another object of the present invention is to solve the various problems in the conventional processes by an extremely simple production process and to produce colloidal antimony oxide having very excellent properties in an industrially advantageous manner, by causing the reaction on antimony trioxide with hydrogen peroxide in an aqueous medium to proceed in a particular tubular reactor.

Other objects of the present invention will become apparent from the following concrete explanation of the invention.

Such objects of the present invention are achieved by reacting a dispersion consisting of antimony trioxide, hydrogen peroxide and water obtained by dispersing antimony trioxide and hydrogen peroxide in water in the ratio of 1 mol to 2 mols or more, while passing said dispersion through a tubular reactor, maintained at a temperature not lower than 90° C., having a shape represented by the formula: $l/D \geq 2000$ wherein $l$ stands for the length of the tube and $D$ stands for the inner diameter of the tube. In the present invention, when a reactor made of a fluorine-containing resin is used, the accumulation of scales on the inner wall of the tube can be prevented and at the same time the reaction can be caused to proceed smoothly, so that it is possible to attain the objects of the invention more advantageously.

Since the colloidal antimony oxide obtained according to the process of the present invention can be produced continuously, the problem of unevenness is quality as observed in the corresponding products by conventional processes are completely eliminated, and the diameter of individual colloid particles become far smaller. Therefore, all the defects caused by the conventional corresponding products, such as for example the deterioration of touch in textile products and other materials, the impairment of color in colored products and the decrease of transparency in films, plastics, resins, etc. can be completely removed. Moreover, since the colloidal antimony according to the present invention has a very high efficiency in providing flame retardancy, it has an advantage of reducing the amount of antimony necessary for obtaining a desired degree of flame retardancy.

Also, it is one of the outstanding characteristics of the present invention that, by the process of the present invention, a colloidal solution of antimony oxide extremely stable upon standing and having excellent properties can be obtained by a very simple operation of merely reacting antimony trioxide with hydrogen peroxide in an aqueous medium in which the antimony trioxide has been dispersed, without using expensive subsidiary materials such as water-soluble organic solvent or ion-exchange resin and without requiring complicated operations, and moreover without using a highly corrosive acid or alkali, as was the case with the conventional techniques.

It is generally believed that when antimony trioxide is oxidized with hydrogen peroxide, antimony pentoxide is formed, as shown in the following reaction formula:

$$Sb_2O_3 + 2H_2O_2 = Sb_2O_5 + 2H_2O$$

In the above mentioned reaction in an aqueous dispersion system, it is thought that $Sb_2O_3$ is oxidized on its particle surfaces and in the aqueous phase in which it is dissolved, and that when $Sb_2O_3$ is converted to $Sb_2O_5$ having a lower solubility in water, the latter separates out as colloidal particles. Also, according to our study, we supposed as follows:

In the reaction by the batch system as in the conventional processes, the temperature rise speed in the reaction system is necessarily made slow; this gives rise to a large difference in the reaction history between $Sb_2O_3$ particles; accordingly, $Sb_2O_5$ formed later is preferentially utilized for the development of $Sb_2O_5$ particle nuclei formed previously, to increase the particle size of the $Sb_2O_5$ particles, rather than newly forming colloidal particle nuclei. On the basis of this supposition, we considered that, to obtain a good quality collodial solution containing collodial particles having a finer diameter, it is necessary to make faster the temperature rise speed of the reaction system and thus to cause the reaction to proceed at one coup. Thus, we reached the idea of continuous reaction form in which the particular tubular reactor according to the present invention is used. Even in the case of continuous reaction, in the ordinary multistage reactor in which a number of reaction vessels are connected in series, $Sb_2O_5$ particles having different reaction history are present as a mixture, and thus $Sb_2O_5$ being formed in utilized for the growth of the nuclei of the previously formed particles. Thus in this case, the same problems are also caused as in the conventional processes, so that it is difficult to produce a colloidal solution having such excellent properties as in the present invention.

The tubular reactor which is of great importance in the present invention is a tube or pipe of an extremely elongated form satisfying the condition: $l/D = 2000$ wherein $l$ is the length of the tube or pipe and $D$ is the inner diameter of the tube or pipe. If such a condition is not satisfied, that is to say, in the case of a reactor having a shorter tube length in which $l/D$ is less than 2000, such a reactor cannot complete the oxidation reaction satisfactorily enough, or if a retention time sufficient for completing the oxidation reaction is given, sedimentation of $Sb_2O_3$ particles occurs in the reaction tube, thus clogging the reaction tube or the transmission of light of the resulting colloidal solution is lowered (because of the generation of coarse $Sb_2O_5$ particles). These troubles are supposed to occur because a longer time is required for the temperature distribution of the reactor in the direction of the tube diameter to become uniform, from the viewpoint of heat transfer. Accordingly, as the value $l/D$ increases, a better result is obtained in the present invention. However, from the standpoint of apparatus designing, its upper limit should be restricted of itself, and a value generally up to about $5 \times 10^4$ can be practically employed. The inner diameter $D$ may vary over a wide range, but for a practical and design point of view, it is preferable to be 2 – 100 mm, more particularly 4 – 50 mm. Especially, the use of a tube made of a fluorine-containing resin such as polytetrafluoroethylene, polychlorotrifluoroethylene, etc. as the tubular reactor protects the tube wall from the accumulation of scales (reaction products), causing the continuous oxidation reaction of the present invention to proceed very effectively and thus making it possible to attain the objects of the present invention very advantageously.

For the tubular reactor used in the present invention, it is necessary to be equipped with a heating means that can heat the dispersion passing through the reaction tube to a temperature higher than 90° C. so that the oxidation reaction by hydrogen peroxide can proceed sufficiently. Furthermore, it is desirable that the dispersion should be passed as a plug flow through the reaction tube. Therefore, the use of a reaction tube having no bend that disturbs the plug flow is advantageous.

As regards the antimony trioxide used in the present invention, those commercially available in powder form are satisfactory. As for its particle diameter, a diameter not larger than 100 $\mu$ is satisfactory. But from the viewpoint of the dispersibility in water and the reactivity with hydrogen peroxide, a diameter not larger than 10 $\mu$ is especially desirable. Further, it is necessary to use hydrogen peroxide in an amount of not less than 3 mols per mol of $Sb_2O_3$, preferably within the range of 5 to 10 mols. Thus, with such a ratio maintained, a dispersion consisting of $Sb_2O_3$, hydrogen peroxide and water is prepared. It is desirable that the concentration of $Sb_2O_3$ in the dispersion should be generally 1 to 20 weight percent, and particularly 5 to 10 weight percent. Although $Sb_2O_3$ can be dispersed in the absence of a dispersing agent, it is particularly desirable to use an usual dispersing agent of a water-soluble polymer such as polyvinyl alcohol, polyacrylic acid or its salts, lignin sulfonic acid or its salts, etc., with its preferable amount of use being 0.01 to 2 weight percent, particularly 0.1 to 0.5 weight percent based on the weight of $Sb_2O_3$. In the case of using polyvinyl alcohol, these having a relatively low degree of polymerization are preferable.

The thus-obtained dispersion consisting of $Sb_2O_3$, hydrogen peroxide and water is then passed through the above mentioned particular tubular reactor. At this time, it is desirable to maintain the temperature of the tubular reactor at a temperature not lower than 90° C., preferably between 95° and 140° C. in order that the oxidation reaction of $Sb_2O_3$ with hydrogen peroxide is caused to proceed completely and that the temperature rise speed is made faster and further that the formation of the nuclei of the colloidal particles is promoted, thereby to obtain a colloidal solution of antimony oxide having a good quality. The retention time of the dispersion in the reaction tube is desirably between 1 and 30 minutes, particularly between 3 and 10 minutes.

The dispersion which has been passed through the tubular reactor under such conditions is converted to a colloidal solution of antimony oxide having an about 1 to 22% solid concentration depending on the concentration of $Sb_2O_3$ in said dispersion. The resulting colloidal solution may be concentrated, as required, to a colloidal solution having a solid concentration not lower than 50% without requiring the addition of a stabilizer. This colloidal solution is, of course, very stable upon standing without destruction of the colloid.

By employing the process of the present invention, all the defects in the conventional processes, i.e., the complexity of process, an increase in cost of the product due to the use of expensive subsidiary materials, uneveness in quality, etc., are entirely removed, and moreover, in quality, this colloidal solution is far superior to the conventional colloidal solutions.

By comparison by transmission of light which is used as a criterion for the size of colloidal particles, while the transmission of light of a colloidal solution (0.4 solid concentration) obtained by a conventional batch system is about 60% at highest, according to the present invention it is possible to produce a colloidal solution of extremely fine particles having a transmission of light of about 95%, in an easy way and at a low cost.

The colloidal antimony oxide obtained according to the present invention may be used in the form of the resulting solution or in the form of a concentrated solution for applications such as flame retardant, or the colloidal solution may be subjected to spray-drying or the like to separate antimony oxide particles and use the separated particles for the above mentioned applications.

The following examples are set forth for a better understanding of the present invention and not for limiting the scope of the invention. All percentages in Examples and Reference Examples are given as those at a wave length of 420 $\mu$ for a colloidal solution having a solid concentration of 0.4%, as measured with a HITACHI-101 Spectrophotometer (Hitachi, Ltd.). The larger the value, the finer the colloidal particles.

Reference Example 1

A dispersion consisting of 5.3% $Sb_2O_3$, 4.2% hydrogen peroxide and 91.5% water was heated in a beaker to 100° C. under stirring. The reaction was continued for 15 minutes under this condition. Thereafter, the resulting colloidal solution was removed and the transmission of light of the colloidal solution at the concentration of 0.4% solid was measured. The transmission showed only 55%.

Reference Example 2

A dispersion consisting of 7.6% $Sb_2O_3$, 5.8% hydrogen peroxide and 86.6% water was passed through a four-stage continuous reactor in which four tank-type reaction vessels were connected. The reaction temperature was 100° C., and the retention time was 10 to 30 minutes. The resulting colloidal solution of antimony oxide showed a transmission of light of 20%, showing a large particle size of the colloid.

EXAMPLE 1

A dispersion consisting of 7.6% $Sb_2O_3$, 5.8% hydrogen peroxide and 86.6% water was passed through a stainless steel tubular reactor having a tube inner diameter of 4 mm and a tube length of 9 mm ($l/D = 2250$), in the form of a plug flow. The reaction temperature was 100° C. and the retention time was 10 to 30 minutes. The transmission of light of the resulting colloidal solution was 80%. This shows that very fine colloidal particles were formed.

EXAMPLE 2

A dispersion consisting of 5.3% $Sb_2O_3$, 5.8% hydrogen peroxide and 88.9% water was passed, in the form of a plug flow, through a tubular reactor made of a polytetrafluoroethylene having tube inner diameter of 6 mm and a tube length of 50 m ($l/D = 8333$). The reaction temperature was 120° C. and the retention time was 5 to 20 minutes. The transmission of light of the resulting colloidal solution was 78%.

EXAMPLE 3

A dispersion consisting of 6.5% $Sb_2O_3$, 5.1% of hydrogen peroxide and 88.4% water was passed, in the form of a plug flow, through a tubular reactor made of a polytetrafluoroethylene having a tube inner diameter of 6 mm and a tube length of 60 m ($l/D = 10000$). The reaction temperature was 120° C. and the retention time was 7 minutes. The transmission of light of the resulting colloidal solution was 96% and a colloidal solution containing very fine colloidal particles was obtained. There was no accumulation of scales on the inner wall of the reaction tube.

EXAMPLE 4

A dispersion consisting of 6.5% $Sb_2O_3$, 5.3% hydrogen peroxide and 88.2% water and added with polyvinyl alcohol (polymerization degree 500, saponification degree 88%) in an amount of 0.2% based on the antimony oxide was passed, in the form of a plug flow, through a tubular reactor made of a polytetrafluoroethylene having a tube inner diameter of 8 mm and a tube length of 200 mm ($l/D = 2500$). The reaction temperature was 120° C. and the retention time was 6 minutes. The transmission of light of the resulting colloidal solution was 91%. There was no accumulation of scales on the inner wall of the reaction tube. A uniform colloidal solution was obtained, without any trouble in continuous reaction operation for a long time. After standing the colloidal solution for more than 6 months, it was very stable with no destruction of the colloid observed.

Reference Example 3

A dispersion consisting of 6.9% $Sb_2O_3$, 5.3% hydrogen peroxide and 87.8% water was passed, in the form of a plug flow, through a stainless steel tubular reactor having a tube inner diameter of 6 mm and a tube length of 10 m ($l/D \approx 1667$) at a temperature of 120° C. to cause the oxidation reaction to proceed. The retention time of the dispersion in the reactor was 5 to 10 minutes. The transmission of light of the thus-obtained colloidal solution was 8%. During the reaction operation, the reaction tube was clogged with precipitated particles of $Sb_2O_3$ and therefore continuous operation for a long time was impossible.

What is claimed is:

1. A process for producing colloidal antimony oxide characterized by reacting an aqueous dispersion obtained by dispersing antimony trioxide and hydrogen peroxide in a ratio of 1 mol of the former to 2 mols or more of the latter into water, while passing said dispersion in the form of a plug flow through a tubular reactor having a shape represented by the formula: $l/D \geq 2000$ wherein $l$ stands for the length of the tube and $D$ stands for the inner diameter of the tube, said aqueous dispersion having a residence time of from about 1 to 30 minutes and being maintained at a temperature of not lower than 90° C within said tubular reactor.

2. A process as claimed in claim 1, wherein the aqueous dispersion contains a dispersing amount of polyvinyl alcohol as a dispersing agent.

3. A process as claimed in claim 2, wherein the dispersing agent is used in an amount of 0.01 to 2% by weight based on the antimony trioxide.

4. A process as claimed in claim 1, wherein the aqueous dispersion contains a dispersing amount of polyacrylic acid or its salts as a dispersing agent.

5. A process as claimed in claim 4, wherein the dispersing agent is used in an amount of 0.01 to 2% by weight based on the antimony trioxide.

6. A process as claimed in claim 1, wherein the aqueous dispersion contains a dispersing amount of lignin sulfonic acid or its salts as a dispersing agent.

7. A process as claimed in claim 6, wherein the dispersing agent is used in an amount of 0.01 to 2% by weight based on the antimony trioxide.

8. A process as claimed in claim 1 wherein the tubular reactor is made of a fluorine-containing resin.

9. A process as claimed in claim 7 wherein the flourine-containing resin is polytetrafluoroethylene.

10. A process as claimed in claim 1 wherein the aqueous dispersion is subjected to the reaction in the tubular reactor at a temperature of 95° – 140° C.

11. A process as claimed in claim 1 wherein the residence time of the aqueous dispersion in the tubular reactor is 3 to 10 minutes.

12. A process as claimed in claim 1 wherein the inner diameter $D$ of the tubular reactor is 2 to 100 mm.

13. A process as claimed in claim 1 wherein the aqueous dispersion contains 5 – 10 mols of hydrogen peroxide per 1 mol of antimony trioxide.

14. A process as claimed in claim 1 wherein the aqueous dispersion contains antimony trioxide in a concentration of 1 – 20% by weight.

* * * * *